(12) United States Patent
Shukla et al.

(10) Patent No.: US 12,547,701 B2
(45) Date of Patent: Feb. 10, 2026

(54) METHOD AND SYSTEM FOR CREATION OF COMPLIANT PASSWORD BY INPLACE FEEDBACK TO PASSWORD COMPOSITION POLICY

(71) Applicant: Tata Consultancy Services Limited, Mumbai (IN)

(72) Inventors: Manish Shukla, Pune (IN); Sreecharan Bojja, Pune (IN); Vijayanand Mahadeo Banahatti, Pune (IN); Sachin Premsukh Lodha, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 52 days.

(21) Appl. No.: 18/752,533

(22) Filed: Jun. 24, 2024

(65) Prior Publication Data

US 2025/0021639 A1 Jan. 16, 2025

(30) Foreign Application Priority Data

Jul. 12, 2023 (IN) .............................. 202321046973

(51) Int. Cl.
*G06F 21/46* (2013.01)
*G06F 3/04886* (2022.01)
*G06F 21/31* (2013.01)

(52) U.S. Cl.
CPC .......... *G06F 21/46* (2013.01); *G06F 3/04886* (2013.01); *G06F 21/316* (2013.01)

(58) Field of Classification Search
CPC .... G06F 21/46; G06F 21/316; G06F 3/04886; H04L 63/12; H04W 12/68

(Continued)

(56) References Cited

U.S. PATENT DOCUMENTS

| 7,042,442 B1 * | 5/2006 | Kanevsky | G06F 3/017 |
| | | | 345/157 |
| 8,441,454 B2 * | 5/2013 | Longe | G06F 3/0237 |
| | | | 345/173 |

(Continued)

OTHER PUBLICATIONS

Blase UR, "Supporting Password-Security Decisions with Data," Thesis, 2016, Carnegie Mellon University, http://reports-archive.adm.cs.cmu.edu/anon/anon/usr/ftp/isr2016/CMU-ISR-16-110.pdf.

(Continued)

*Primary Examiner* — Lizbeth Torres-Diaz
(74) *Attorney, Agent, or Firm* — Finnegan, Henderson, Farabow, Garrett & Dunner, LLP

(57) ABSTRACT

There is a need for design and implementation of interfaces for providing user-friendly feedback while creating and updating compliant passwords. This disclosure relates to a method of creating compliant password by in-place feedback to a password composition policy (PCP). A policy-enabled-virtual keyboard (PKBD) receives input from a user and is processed based on parameters associated with the PCP to identify accessible and inaccessible keys on the PKBD with in-place feedback. The in-place feedback is provided to highlight accessible keys of the PKBD for the user, if class associated with character, or mandated number of characters by the PCP are received are covered. Alternatively, the keys of the PKBD are disabled for access to the user by validating if class associated with character received are not covered, and a deviation of the parameters. A compliant password is created based on the PCP by providing in-place feedback for a resultant validation.

20 Claims, 16 Drawing Sheets

(58) Field of Classification Search
USPC .............................................. 726/6; 345/173
See application file for complete search history.

(56) References Cited

U.S. PATENT DOCUMENTS

| | | | |
|---|---|---|---|
| 9,524,393 | B2 | 12/2016 | Aggarwal et al. |
| 10,223,517 | B2 | 3/2019 | Kandekar |
| 10,824,196 | B1* | 11/2020 | Thigpen ................ G06F 1/1639 |
| 11,481,109 | B2* | 10/2022 | Westerman ............. G06F 3/013 |
| 11,558,375 | B1* | 1/2023 | Cao ....................... H04L 9/3226 |
| 12,118,207 | B2* | 10/2024 | Patra ................... G06F 3/04886 |
| 12,131,136 | B2* | 10/2024 | Nasirishargh ............. G06F 8/34 |
| 2009/0174667 | A1* | 7/2009 | Kocienda ............ G06F 3/04895 |
| | | | 345/169 |
| 2010/0164897 | A1* | 7/2010 | Morin ................... G06F 3/0346 |
| | | | 345/173 |
| 2019/0243959 | A1* | 8/2019 | Radoslaw .............. G04G 21/00 |
| 2020/0380115 | A1* | 12/2020 | Knight ..................... G06F 21/46 |
| 2021/0081524 | A1* | 3/2021 | Moon ...................... G06F 21/46 |
| 2024/0419294 | A1* | 12/2024 | Krivoruchko ....... G06F 3/04815 |

OTHER PUBLICATIONS

Richard Shay, "Creating Usable Policies for Stronger Passwords with MTurk," Title of the item: Thesis, 2015, Carnegie Mellon University, http://ra.adm.cs.cmu.edu/anon/usr/ftp/usr0/anon/isr2015/CMU-ISR-15-100.pdf.

Richard Shay et al.," Designing Password Policies for Strength and Usability," ACM Transactions on Information and System Security, 2016, vol. 18; Issue: 4, ACM, https://dl.acm.org/doi/abs/10.1145/2891411.

Anuj Gautam et al., "Improving Password Generation Through the Design of a Password Composition Policy," Description Language, Proceedings of the Eighteenth Symposium on Usable Privacy and Security, Date: 2022, USENIX Association, https://www.usenix.org/system/files/soups2022-gautam.pdf.

Saranga KomandurI et al., "Telepathwords: Preventing Weak Passwords by Reading Users' Minds," Proceedings of the 23rd USENIX Security Symposium, 2014, USENIX Association Link: https://www.usenix.org/system/files/conference/usenixsecurity14/sec14-paper-komanduri.pdf.

* cited by examiner

METHOD AND SYSTEM FOR CREATION OF COMPLIANT PASSWORD BY INPLACE FEEDBACK TO PASSWORD COMPOSITION POLICY

PRIORITY CLAIM

This U.S. patent application claims priority under 35 U.S.C. § 119 to: India Application No. 202321046973, filed on Jul. 12, 2023. The entire contents of the aforementioned application are incorporated herein by reference.

TECHNICAL FIELD

This disclosure relates generally to a security system, and, more particularly, to method and system for creation of a compliant password by in-place feedback to password composition policy.

BACKGROUND

There are multiple ways to authenticate a human user, for example, text-based passwords, fingerprint, one-time-passwords, facial recognition, and behavioral biometrics. Each of these methods have their advantages in certain environment and scenarios. However, text-based password remains the most common means of authenticating a human user, especially on web sources which provides a good trade-off between implementation effort, ease of management, ease of use and security. The textual passwords are still widely used for authenticating users for accessing offline and online services. Despite its proliferation, the text based password is often considered weaker than any latest authentication technologies due to their brevity and poor password hygiene. The recent data breach reports cite poor password practice as a primary reason behind one-third of the data breaches. A password created by following such practice is easily guessable as users follow common patterns, use short passwords, and reuse passwords.

A password composition policy (PCP) helps system administrators in handling inherent and user-induced weakness in text-based passwords. The PCP specifies password's minimum length, character classes (e.g., uppercase, lowercase, digits, and special characters) to use, and do not contain dictionary words and personal information. It can additionally enforce a password expiry date and a history requirement, i.e., the user do not reuse their previous passwords. Unfortunately, the recent research highlights that it is difficult to create and remember passwords when strict and complex password policy is enforced. Further, in real-life, users may not read the PCP or find it too hard to read and comprehend. The additional load to comply with the password ageing policy at regular intervals annoys and frustrate the users as it forces them to face the same usability issues. This eventually led users to rely on insecure password creation practice, such as partial reuse of old password, recycling of old passwords, and use of common patterns. The system administrators enforce the password composition policy (PCP) and blacklists to discourage users from creating weak passwords. However, the PCP have become more complex over the years. Past research has shown that users often struggle to comprehend and adhere to a complex PCP. Prior research has explored the effect of feedback on usability and security of password composition policy in the context of password strength meter and under different constraints, such as blacklist and minimum length. Existing approaches have explored the techniques that helps users in successful navigation of difficult requirements. Similarly, approaches found that the user friendliness of password registration error message on 231 websites.

In the past research, the users create and use the passwords, and often face inconvenience to update the password, desire for memorability, password fatigue, and lack of clarity about required actions are cited as a primary reason behind the poor password hygiene. Admins create a policy but if they are hard or too strict then the users tend to adopt a coping strategy, for example, pattern reuse. This can be avoided by a password manager but using and maintaining the password manager is difficult due to the cited reasons. To certain extent the 'password manager' try to address the issue of security (e.g., length, reuse, and complexity), and usability (e.g., password fatigue, memorability, and autologin) in password-based authentication. In existing scenario, when technical means are used for generating and populating the password field then it results in stronger passwords. However, this also discourage users from using the 'password manager' as these 'strong passwords' are challenging to enter and remember when the manager is unavailable. The low adoption of password managers is also attributed to user's age, their awareness of the password manager, trustworthiness, confusion about the source of password prompts or the meaning of "remember me" option. Further, applications can reject the password generated by the password manager due to mismatch in their respective 'password composition policy' (PCP), thus introducing a usability issue.

According to updated digital identity guidelines, the minimum length of the password should be at least eight characters long, should not enforce minimum number of character classes, allow passphrases, and disallow blacklisted passwords. For the password creation and update, the guidelines further suggest clearly communicating the secret requirements and providing clear, meaningful, and actionable feedback for rejected passwords. A similar observation on displaying policy rules and feedback at the time of password creation was made by past research work. However, the existing work has primarily focused on users with some understanding of computers and password management and with little or no accessibility issues. There are systems which provide visual feedback using text content. However, they are not suitable for users with vision disability, assumes a minimal literacy level of users and do not have the same behavior across various device types, that is, a text based becomes verbose on a device with small screen. This leaves a large security gap when the user population consists of the children, elderly, and the individuals with disabilities, especially related to sight. The existing work in this space provide feedback by using text and assumes that the users possess basic education to read these cues and rectify their password, which is a wrong assumption. Moreover, showing all potential rules in the text-form is not user-friendly and it is also a tedious task, especially on a smaller device with limited viewing area. Their struggle is well reflected in the many attempts required to create a compliant password and in the various coping strategies that the users come up with.

SUMMARY

Embodiments of the present disclosure present technological improvements as solutions to one or more of the above-mentioned technical problems recognized by the inventors in conventional systems. For example, in one embodiment, a processor implemented method of creating a compliant password for a user by one or more in-place feedbacks on a policy-enabled-keyboard (PKBD) is provided. The processor implemented method comprises: initializing, via one or more hardware processors, one or more data structures based on one or more configuration file; configuring, via the one or more hardware processors, one or more keys of a policy-enabled-virtual keyboard (PKBD) based on a predefined password-composition policy (PCP); receiving, via the one or more hardware processors, at least one input from a user; processing, via the one or more hardware processors, the at least one input from the user based on one or more parameters associated with the predefined password-composition policy to identify one or more accessible keys and one or more inaccessible keys on the policy-enabled-virtual keyboard (PKBD) with one or more in-place feedbacks, wherein the step of processing comprises: (a) providing, via the one or more hardware processors, a first in-place feedback to highlight one or more accessible keys of the policy-enabled-virtual keyboard (PKBD) for the user, if class associated with at least one character, or at least one mandated number of character by the PCP are received as the input from the user are covered; or (b) disabling, via the one or more hardware processors, the one or more keys of the policy-enabled-virtual keyboard (PKBD) for access to the user with a second in-place feedback by validating if class associated with at least one character received as the input from the user are not covered, and a deviation of the one or more parameters; and creating, via the one or more hardware processors, at least one compliant textual password based on the password composition policy by providing one or more in-place feedbacks for a resultant validation. The at least one input corresponds to one or more keys pressed at the policy-enabled-virtual keyboard (PKBD). The at least one mandated number of character corresponds to at least one lower case character.

In another aspect, there is provided a system for creation of a compliant password for a user by one or more in-place feedbacks on a policy-enabled-keyboard (PKBD). The system includes a memory storing instructions; one or more communication interfaces; and one or more hardware processors coupled to the memory via the one or more communication interfaces, wherein the one or more hardware processors are configured by the instructions to: initialize, one or more data structures based on one or more configuration file; configure, one or more keys of a policy-enabled-virtual keyboard (PKBD) based on a predefined password-composition policy (PCP); receive, at least one input from a user; process, the at least one input from the user based on one or more parameters associated with the predefined password-composition policy to identify one or more accessible keys and one or more inaccessible keys on the policy-enabled-virtual keyboard (PKBD) with one or more in-place feedbacks, wherein the step of processing comprises: (a) provide, a first in-place feedback to highlight one or more accessible keys of the policy-enabled-virtual keyboard (PKBD) for the user, if class associated with at least one character, or at least one mandated number of character by the PCP are received as the input from the user are covered; or (b) disable, the one or more keys of the policy-enabled-virtual keyboard (PKBD) for access to the user with a second in-place feedback by validating if class associated with at least one character received as the input from the user are not covered, and a deviation of the one or more parameters; and create, at least one compliant textual password based on the password composition policy by providing one or more in-place feedbacks for a resultant validation. The at least one input corresponds to one or more keys pressed at the policy-enabled-virtual keyboard (PKBD). The at least one mandated number of character corresponds to at least one lower case character.

In yet another aspect, there are provided one or more non-transitory machine readable information storage mediums comprising one or more instructions which when executed by one or more hardware processors causes at least one of: initializing, one or more data structures based on one or more configuration file; configuring, one or more keys of a policy-enabled-virtual keyboard (PKBD) based on a predefined password-composition policy (PCP); receiving, at least one input from a user; processing, the at least one input from the user based on one or more parameters associated with the predefined password-composition policy to identify one or more accessible keys and one or more inaccessible keys on the policy-enabled-virtual keyboard (PKBD) with one or more in-place feedbacks, wherein the step of processing comprises: (a) providing, a first in-place feedback to highlight one or more accessible keys of the policy-enabled-virtual keyboard (PKBD) for the user, if class associated with at least one character, or at least one mandated number of character by the PCP are received as the input from the user are covered; or (b) disabling, the one or more keys of the policy-enabled-virtual keyboard (PKBD) for access to the user with a second in-place feedback by validating if class associated with at least one character received as the input from the user are not covered, and a deviation of the one or more parameters; and creating, at least one compliant textual password based on the password composition policy by providing one or more in-place feedbacks for a resultant validation. The at least one input corresponds to one or more keys pressed at the policy-enabled-virtual keyboard (PKBD). The at least one mandated number of character corresponds to at least one lower case character.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
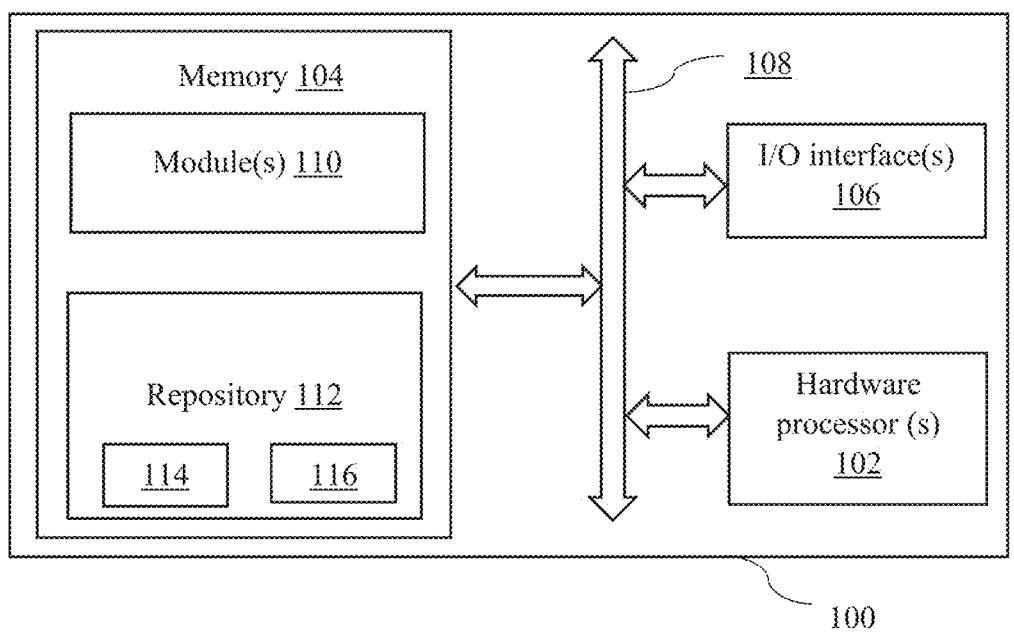
FIG. 1 illustrates a system to create a compliant password for a user by in-place feedback provided on a policy-enabled-keyboard (PKBD) embedded with a password composition policy, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for design and implementation of creative interfaces for providing user-friendly feedback while creating and updating compliant textual passwords. Embodiments of the present disclosure provide a method and system for creation of compliant password for user by in-place feedback on policy-enabled-keyboard (PKBD). The policy-enabled-keyboard (PKBD) is an intuitive, interactive, and responsive virtual keyboard (KBD) embedded with a password composition policy (PCP) that supports blacklists, reuse checks, and ensures conformance to the PCP in-situ (e.g., in-place). The embodiments of the present disclosure configure the virtual keyboard (KBD) for password creation by embedding the password composition-policy, providing the in-place feedback when password validation fails for the configured PCP, providing but is not limited to visual, audio, and haptic cues for accessibility, and also deterring users from password and pattern reuse.

Referring now to the drawings, and more particularly to FIG. 1 through 8C, where similar reference characters denote corresponding features consistently throughout the figures, there are shown preferred embodiments, and these embodiments are described in the context of the following exemplary system and/or method.

FIG. 1 illustrates a system 100 to create a compliant password for a user by the in-place feedback provided on a policy-enabled-keyboard (PKBD) embedded with a password composition policy, according to an embodiment of the present disclosure, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, the database stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2:
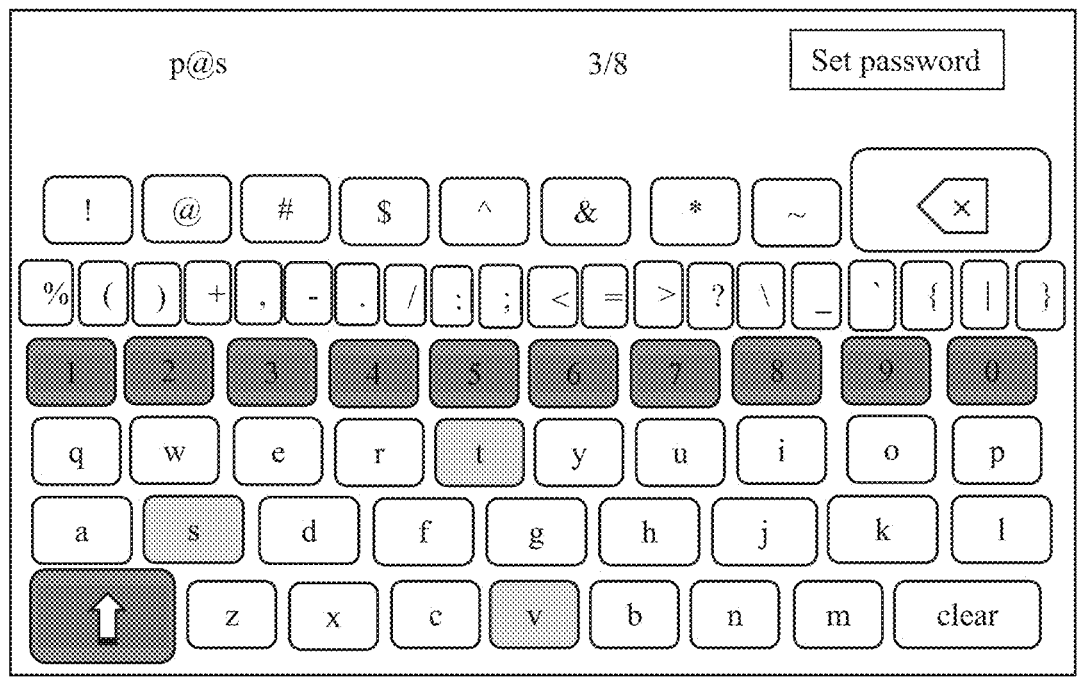
FIG. 2 is an exemplary view of the policy-enabled-virtual keyboard (PKBD) for the creation of the password, according to some embodiments of the present disclosure.

FIG. 2 is an exemplary view of the policy-enabled-virtual keyboard (PKBD) 200 for the creation of the password, according to some embodiments of the present disclosure. The policy-enabled-virtual keyboard (PKBD) 200 is a variant of virtual keyboard (KBD), which helps in the password creation with the in-place feedback for user actions. The virtual keyboard (KBD) may be a software-based keyboard which does not require physical keys for inputting characters, and also configured to map one or more functionalities to a physical keyboard. The virtual keyboards are extensively used by financial institutions for obtaining customer password and mitigating keystroke logging attack. For example, vanilla keyboard with a software based keyboard scheme, which allows the user to interact and input text data in an input field. The virtual keyboard is configured by embedding with a password composition policy (PCP) providing but not limited to a visual, an audio, and haptic cues for accessibility and deterring users from password and pattern reuse. In an embodiment, the virtual keyboard is selected which are available on various devices (e.g., desktop, mobile and handheld device), and supports assistive technologies. In an embodiment, the in-place feedback is also referred to as in-situ feedback. The in-place feedback is particularly utilized by young and elderly users as they are either not used to or unable to follow good practices for the password creation or require additional assistance in the form of visual, haptic, or auditory feedback.

The policy-enabled-virtual keyboard (PKBD) 200 for the PCP includes but is not limited to one or more classes i.e., four classes (e.g., uppercase, lowercase, number, special token), and minimum password length of eight characters. The PCP are also based on an organization's requirement. For example, a PCP may dictate that the password length should be between 10 characters and 16 characters, with any combination of the 4 character class. In alternative scenario, another PCP may consist of a minimum password length of 10 characters, with uppercase, lowercase, numbers and only (. and *) for special characters. Another example may restrict the minimum length to 8 characters, but allow only uppercase, lowercase, and special character classes. In an embodiment, the algorithm is implemented in a linear time for the in-place feedback i.e., visual, audio, and haptic feedback. For example, one or more available keys on the keyboard are highlighted in a real-time while the password is being inserted by the user. The cues are provided by coloring one or more keys in keyboard. For example, (a) dark grey color with text in black color (not visibly highlighted in the Figure) which highlights that the user have not exhausted requirements for a specific character class, (b) white color highlights that minimum requirement for that character class is fulfilled, and (c) gray color highlights that the character is not allowed which leads to a breached password or common pattern. The audio cues are provided for minimum character requirement and prohibited characters as they would lead to the breached password. In an embodiment, the audio cues are also accompanied by haptic cues in mobile devices where haptic controls are available. The cues which include configuration of audio i.e., click on audio icon (e.g., alert tone or frequency), haptic i.e., longer time for haptic queue to aged person with a longer duration between each alert notification. In another embodiment, the in place feedback are extended but is not limited to: (a) size of character may be increased or decreased from original size, (b) size of the virtual key on the policy-enabled-virtual keyboard (PKBD) 200.

Figure 3:
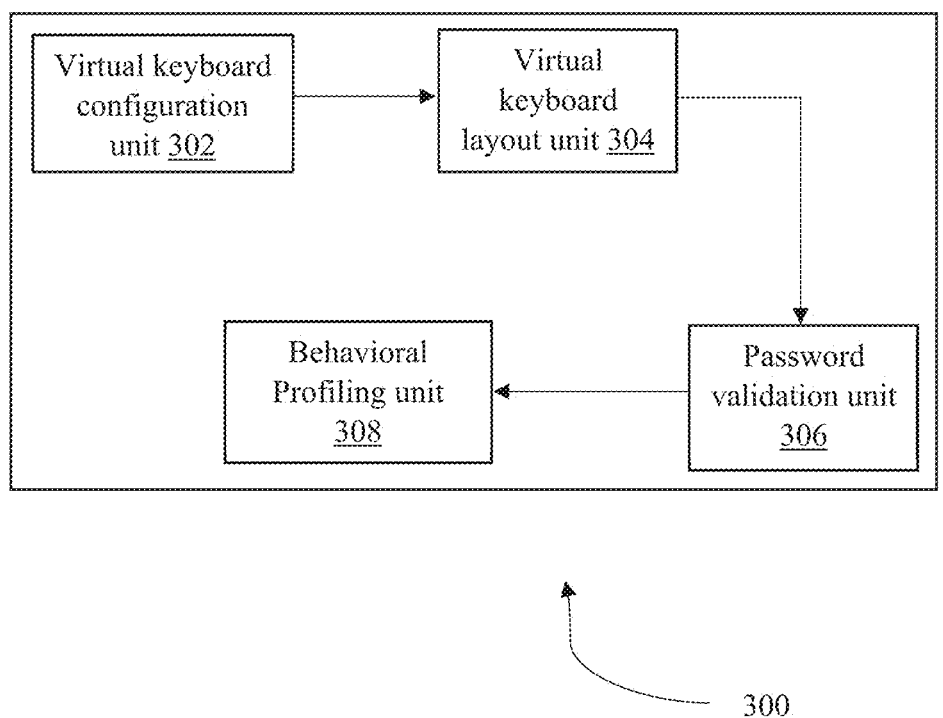
FIG. 3 illustrates an exemplary functional block diagram of components of the system as depicted in FIG. 1, to interact with the policy-enabled-virtual keyboard (PKBD) as depicted in FIG. 2, according to some embodiments of the present disclosure.

FIG. 3 illustrates an exemplary functional block diagram of components of the system 100 as depicted in FIG. 1, to interact with the policy-enabled-virtual keyboard (PKBD) 200 as depicted in FIG. 2, according to some embodiments of the present disclosure. The system 300 may be an example of the system 100 (FIG. 1). In an example embodiment, the system 300 may be embodied in, or is in direct communication with the system, for example the system 100 (FIG. 1). In another example embodiment, the system 300 may be alternatively referred to as the policy-enabled-virtual keyboard (PKBD) which includes four components. The system 300 includes a virtual keyboard configuration unit 302, a virtual keyboard layout unit 304, a password validation unit 306, and a behavioral profiling unit 308.

The virtual keyboard configuration unit 302 is configured to read configuration file and initializing appropriate data structures. The appropriate data structures which are populated correspond to: (a) password-composition policy structures, (b) blacklist structure, (c) cues, (d) message digest, and (e) thresholds. The password-composition policy structures include but not limited to length, characters classes, historical reuse requirement. The blacklist structures include but is not limited to list of dictionaries, character threshold, pre-processing, transformations. The cue includes but is not limited to includes colors codes, audio, haptic. The message digest includes but is not limited to password and pattern digest for reuse check. The thresholds include but are not limited to threshold for diversity index and suspicious behavior detection. In an embodiment, a natural language processing based model and a heuristic based model are implemented for identifying password and sequence reuse to reduce potential password space to the user for a given PCP, i.e., character classes and length requirement. The diversity index is maintained high for the user password. The diversity index is a quantitative measure that reflects how many different characters types (e.g., uppercase, lowercase, number, special tokens) are available in the password dataset. Consider, below mentioned are exemplary pseudo codes that shows an instance of the configuration file.

```
{
  "policy" : {
    "min_length": 8,
    "max_length": 64,
    "require": ["lowercase", "uppercase", "symbols", "numbers"]
  },
  "preprocessing" : {
    "transformation" : ["leet", "numeric", "symbols"],
    "segmentation" : true
  },
  "blacklist" : {
    "list": ["https://example.com/bl/xato.txt"],
    "blacklist_chars": 3
  },
  "reuse_check" : {
    "enabled": true,
    "reuse_window": 4,
    "digests": [["3bfff4090ead3776f67",
      "63e8255bfd8d01ae16898","",→"853855fc4805af114d","b102a008fff39e2e9e2a"]]
  },
  "thresholds" : {
    "diversity" : 0.8,
    "anomaly" : 0.6
  }
}
```

The policy key describes the password-components-policy with three sub-fields includes 'min_length' (minimum password length), 'max_length' (maximum password length), 'require' which is a list of character classes required by the organization PCP. The possible values are 'lowercase', 'uppercase', 'symbols', and 'numbers'. Similarly, the preprocessing key describes the preprocessing needed before any further analysis. The preprocessing key consists of two sub-fields: 'transformation' and 'segmentation'. The 'transformation' key directs the PKBD to apply one or more predefined transformations, e.g., 'leet' transformation detects whether the password is created by a leet transformation, if yes then reversal is performed. For example, for a given password 'p@ssw0rd', 'Leet' transformation returns 'password'. The 'numeric' and 'symbols' value results in removing those characters from the password. For example, for the given password 'p@ssw0rd', 'numeric' may return 'p@sswrd', 'symbols' may return 'psswOrd', and combination of both may return 'psswrd'. The 'segmentation' key decides whether the password should be broken down into meaningful sub-words. For example, the password 'helloalice' could be segmented into 'hello' and 'alice' both which are dictionary words and susceptible to dictionary based guessing attack. First algorithm shows an implementation for segmenting the word into sub-word. Consider, below mentioned are exemplary pseudo codes that shows how segments a word into sub-words. For example, a set of candidate segments that can be verified against specified dictionaries (e.g., name, place, words etc.).

```
procedure NaiveSegmentation (list, word, residue)
  i = 1, len = length(word)
  while (i ≤ len) do
    segment = substring(word, 0, i)
    if length(segment) < len then
      NaiveSegmentation(list, substring(word, i), residue + segment
      + " ")
    else
      append(list, residue + segment)
    end if
    i = i + 1
  end while
end procedure
```

The blacklist key specifies list of breached password datasets and associated location for download or lookup. The blacklist key also specifies minimum number of characters after which the lookup happen and update the state of the keyboard. For example, if the 'blacklist_chars' is set as three, then the blacklist validation happen after the third character. In validation, a list of characters that are at the 4th index are returned and start with the user entered three characters. For example, if the blacklist is ['password', 'past', 'ritual', 'word'], and let 'pas' be the first three characters then the validator returns ['s', 't'].

The reuse_check key describes the reuse settings. There are three sub-fields: a) 'enabled' includes boolean values and used for toggling reuse check, b) 'reuse_window' describes the consecutive number of characters that are used for analysis, default value is four, and c) 'digests' is the digest of hashes for reuse checking. The PKBD also uses heuristics for detecting reuse of personal information, for example, check is performed, whether username is used in password i.e., either fully or partially. The thresholds key specifies the various thresholds needed in the analysis. The two sub-fields: a) 'diversity', and b) 'anomaly' describe the thresholds for password diversity index and anomaly score while creating the password.

The virtual keyboard layout unit 304 is configured to draw the keyboard on a device screen and setting up as per the configuration. The virtual keyboard layout unit 304 maintains a finite state machine for tracking state of the keyboard according to the user input. The PKBD 200 instantiate the virtual keyboard with one or more configurations. For example, check for one or more types of constraints i.e., blacklisted passwords and a minimum character class composition. In an embodiment, the policies can be configured upfront in the PKBD 200. The layout, key combination, and color code can also be customized through an external configuration file.

FIG. 4A through FIG. 4D are exemplary user interface views of the policy-enabled-virtual keyboard (PKBD) 200 with realtime in-situ feedback provided to the user, according to some embodiments of the present disclosure. In an embodiment, the PKBD 200 considers three main colors for providing the feedback about the state of the password creation process. Dark grey color with text in black color (not visibly highlighted in the Figure) is to highlight all the keys belonging to a character class, which is not used for specified number of times in the password. When the blacklist validation or reuse validation fails then grey color is used for disabled keys. For example, in the blacklist validation, the PKBD 200 proactively disables the keys and changes the color to grey, which result in a prohibited string. Whereas, for restricting reuse, disables all the keys, except backspace and clear keys for allowing change in the entered character sequence. Finally, white color is used for highlighting all the potentially available characters/keys. The feedback for the length constraint is provided by showing the remaining number of characters. In an embodiment, the PKBD 200 also supports multiple length rules as prescribed for certain websites. Regarding the colors added within the keyboard, the colors that are selected having high contrast and high luminance contrast, to provide aid in better legibility. Luminance contrast is the differences in luminance between the foreground and the background e.g., for the PKBD 200, the selected colors with high luminance contrast and color contrast.

Figure 4A:
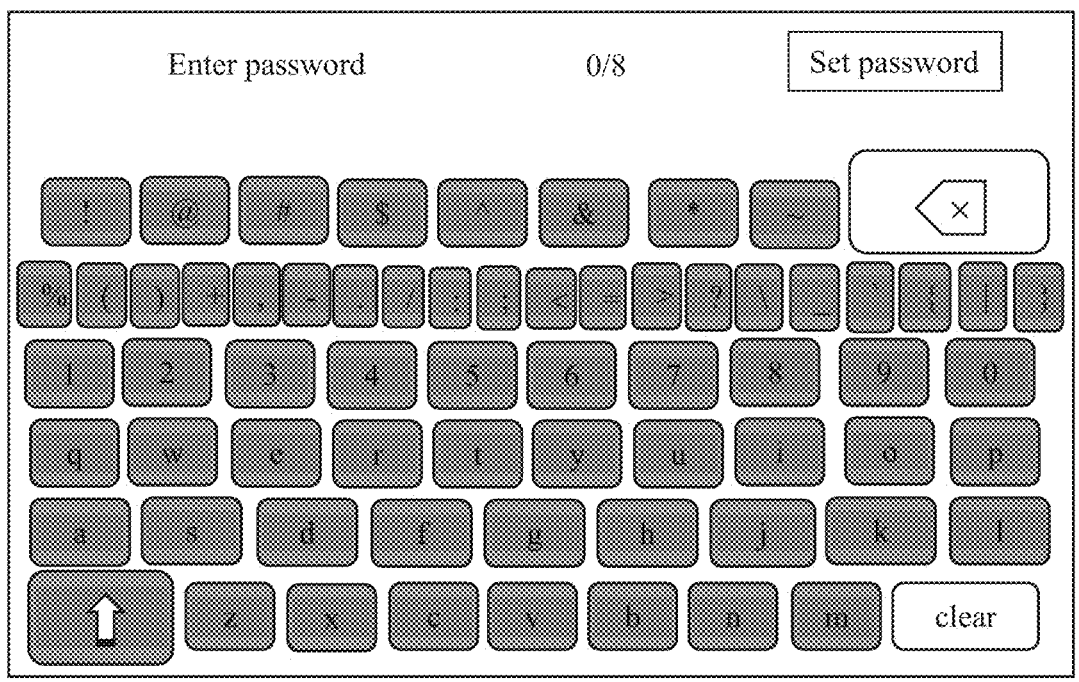
FIGS. 4A, 4B, 4C, and FIG. 4D are exemplary user interface views of the policy-enabled-virtual keyboard (PKBD) with realtime in-situ feedback provided to the user, according to some embodiments of the present disclosure.
Figure 4B:
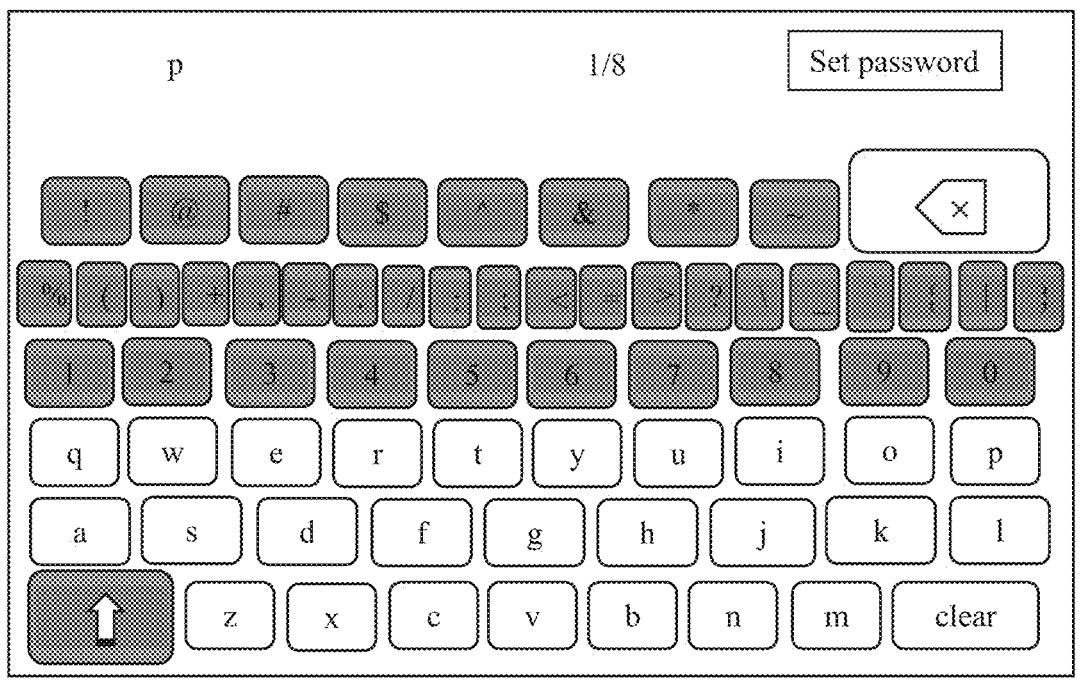
Figure 4C:
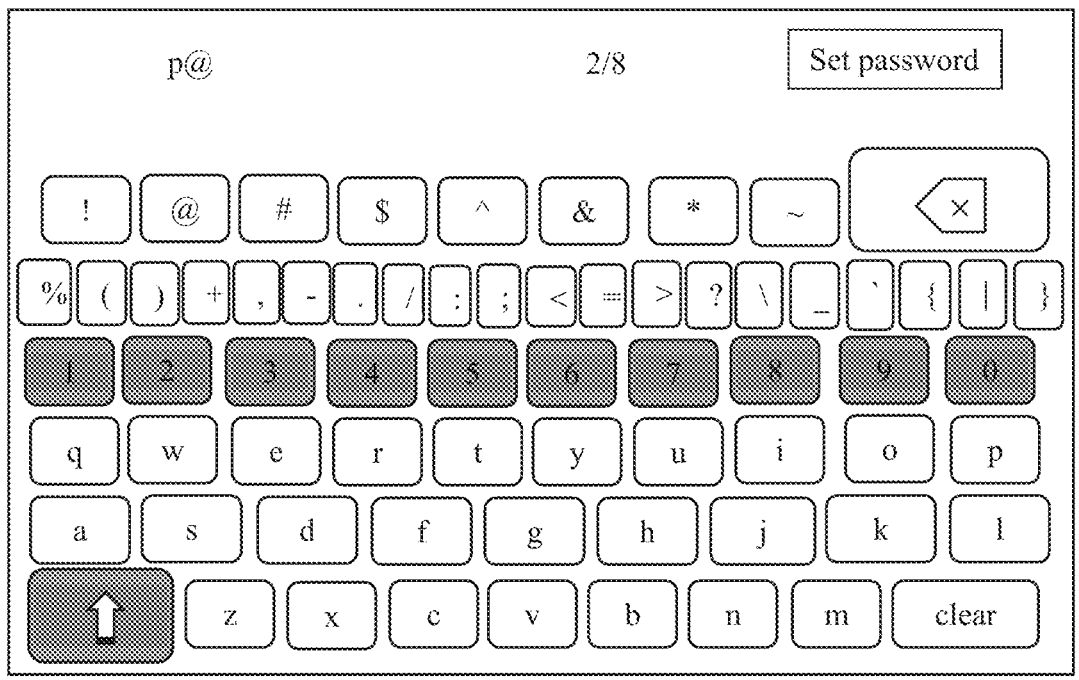
Figure 4D:
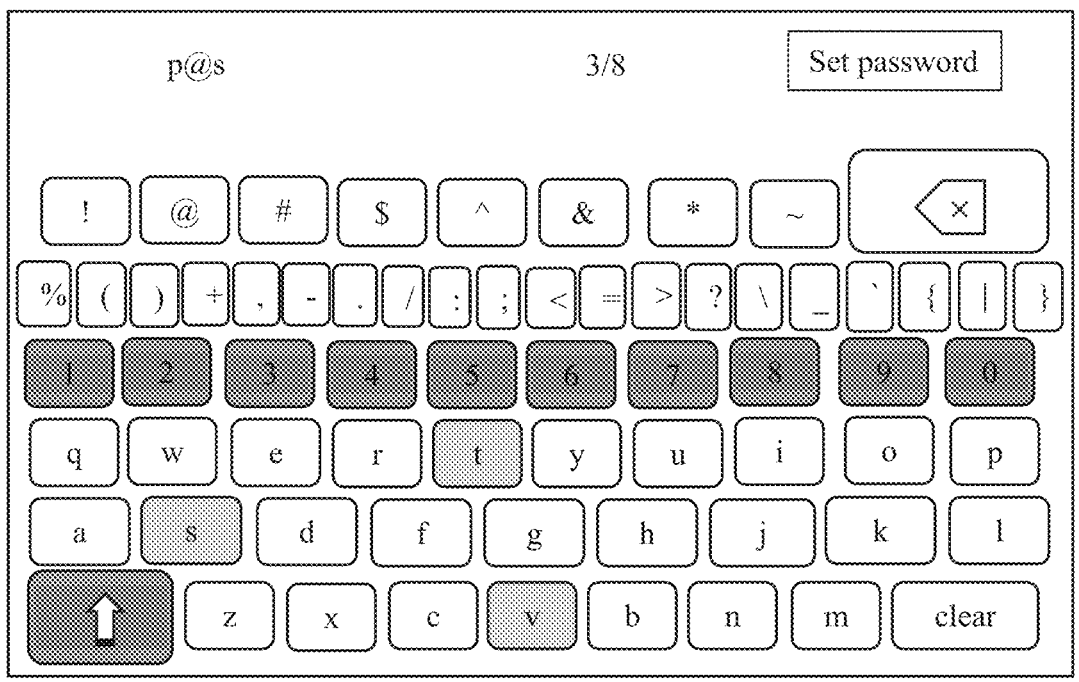

In FIG. 4A and FIG. 4B, at least one character from the category highlighted in the dark grey color with text in black color (not visibly highlighted in the Figure) is required. The color of the background changes from 'black' to 'white' color happens when the required number of characters from that class are used. For example, if the PCP mandates that the password must have at least two lowercase characters then the color of all the lowercase keys is changed to white when at least two lowercase characters are present in the password. 'White' color corresponds to that the characters from that class are available, whereas 'black' color highlights that the PCP requirements for that class are not fulfilled. If special characters are not necessarily needed, then all the special characters may be colored light gray. The user can select any number of keys from this category. The state of the keys may change as the user progress with the password creation. For example, in FIG. 4D, the user entered 'p@s', which resulted in disabling of certain keys and associated color changed to grey color, which denotes the state change happened due to failing of the blacklist and common reuse pattern validation.

Figure 5:
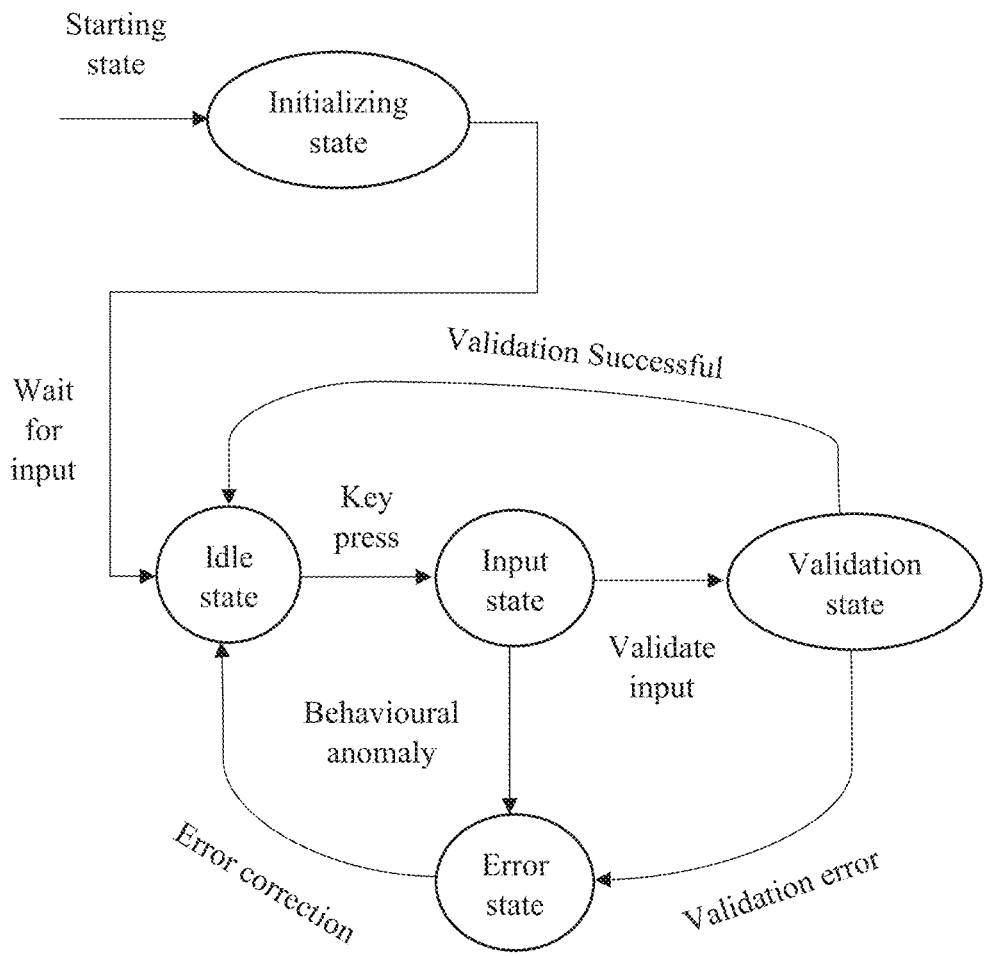
FIG. 5 is an exemplary state diagram of the policy-enabled-virtual keyboard (PKBD), according to some embodiments of the present disclosure.

FIG. 5 is an exemplary state diagram of the policy-enabled-virtual keyboard (PKBD) 200, according to some embodiments of the present disclosure. The PKBD 200 goes through four distinct states. For example, when the application starts, the keyboard moves into 'init state' which is configured according to one or more configured rules. From the 'init state' then moves to an 'idle state' and wait for response from the user. One or more behavioral attributes are analyzed when a key is pressed, if seems suspicious then go to an 'error state', otherwise go to 'validation state'. The user input is validated against blacklists and reuse patterns. If the check is successful, that is no issues are encountered then go back to the 'idle state', otherwise go to the 'error state'. Once the error is rectified then move from the 'error state' to the 'idle state'. The color of the keys, audio, and haptic feedbacks are triggered according to the states shown in the FIG. 5.

The password validation unit 306 is configured to check if there are any deviation from configured rules, usage of blacklisted phrases and keywords, reuse of personal data, and past password and patterns. Compliance with PCP check is performed to identify whether the configured password length and character class requirements are fulfilled. Consider, below mentioned are exemplary pseudo codes shows the implementation of compliance check for PCP:

```
procedure CHECKPCPCOMPLIANCE (pwd, PCP, state)
    flag = true
    for ch ∈ PCP do
        required = PCP[ch]
        count = COUNTCHARSOFCLASS(pwd, ch) ⇨ Count characters of
    class 'ch'
        condition = (count < required)
        UPDATEKEYBOARD(ch, state, condition) ⇨ Update keys as per
    ch, state & condition
        if condition == true then
            flag = false
        end if
    end for
    len = length(pwd)
    condition = ((len > PCP.min_length) and (len ≤ PCP.max_length))
    return (condition and flag)
end procedure
```

In an embodiment, the state of the PKBD is updated accordingly in case of a validation failure. For example, if the blacklist contains a p@ssw0rd and the blacklist threshold is three characters then the validation module flags any password starting with 'p@s'. If the transformations are enabled then the password validation unit 306 try to detect reverse leet transformations and checks in the dataset. The leet is another alphabet for the english language that is used mostly on the internet which uses various combinations of ASCII characters to replace english (or other language) letters. For example, leet spellings of the word password could be p@ssw0rd. A reverse leet transformation would try to convert the transformed word to pure english word. The blacklist check highlights whether the user is entering a password which could be in the breached password dataset. In an embodiment, when the number of characters entered by the user are more than 'blacklist_chars' then the blacklist check is performed for all subsequent new characters. For example, if the 'blacklist_chars=3' then the PKBD 200 start breached password look up from third character onwards. The breached passwords are stored in appropriate data-structure for efficient packing and lookups. For example, the data-structure may be a Trie, a binary search tree, hasmaps or an aho-corasick automaton. Consider, below mentioned are exemplary pseudo codes for checking blacklisted passwords:

```
procedure CHECKBLACKLIST (search datastructure, pwd,
blacklist_chars)
    blocked = { }                    ⇨ An empty set
    len = length(pwd)
    if len < blacklist_chars then
        return blocked
    end if
    candidates = SEARCH (search datastructure, pwd) ⇨ Returns a list of
    passwords starting with pwd
    for candidate ∈ candidates do
        if length(candidate) == len then ⇨ No candidates has length <
    'len'
            continue
        end if
        add(blocked, candidate[len]) ⇨ We are assuming '0' based indexing
    end for
    return blocked              ⇨ Set of characters to block
end procedure
```

For example, if the blacklist includes the following words, '[Lamp, Lion, Mane, Many, Manor, Mania, Manic, Mango, Manly, Newton, New]', and is set blacklist_chars=3, then, for the following sequence of characters, 'Man', the Algorithm 3 returns a list consisting of '[e, y, o, i, g, l]'. If the returned list is not empty then the state of the keyboard changes to 'error state' and disable all the keys returned by the algorithm. The keyboard moves in to 'idle state' when the user rectify the issue by either deleting the character 'n' or using the next character which is not '[e, y, o, i, g, l]'. If the transformations are enabled then the same check is performed with transformed password too. In an embodiment, a binary search tree may be used for arranging the passwords in specific order, e.g., Lexicographic order. The lexicographic ordering is defined as the order that each string appears in a dictionary. The corresponding characters of the two strings are compared from left to right to determine which string is lexicographically larger. The first character where the two strings differ determines which string comes first.

In an embodiment, considering name and email of the participants for detecting the reuse behavior, the algorithm converts the password into shingles of the desired window (e.g., default value is 4), a hash for each shingle is calculated, and finally returns a list of hashes. The shingles represents contiguous subsequences of characters within the password string. For example, for a window size of 4 and password "W0rd$m1th", the shingles are 'W0rd', '0rd$', 'rd$m', 'd$m1', '$m1t', and 'm1th'. At runtime, the PKBD 200 receives a list of digests for strings against which are needed to find the reuse and notify the user. The same window size is utilized with which the input digest is created. Consider, below mentioned are exemplary pseudo codes shows the complete implementation for converting a password string into a list of hashed shingles.

```
procedure GETDIGEST (password, window)
    digest = [ ]
    idx = 0, len = length(password)
    while idx < len do
        upper = idx + window
        if upper ≥ len then
            break
        end if
        shingle = password[idx:upper]
        enc = encode(shingle, encoding='utf-8')
        buffer = hash(enc)
        hex = to_hex_string(buffer)
        digest = digest + hex        ⇨ append to the list
    end while
    return digest
end procedure
```

The process begins by first converting the user entered string into a list of hashed shingles and then the list for comparison with the digests. If a partial reuse is found then the starting location is shared with a feedback module for disabling the keys, changing the color to grey, and type of reuse detected. Consider, below mentioned are exemplary pseudo codes shows the reuse check on client. Used for changing key state and for providing visual feedback.

```
procedure FINDREUSE (digests, password, window) ⇨ digests is a list of
digest of strings
    pwd_digest = GetDigest(password, window) ⇨ get the digest of the
    entered text
    for digest ∈ digests do
        idx = 0
        for p_d ∈ pwd_digest do
            if contains(digest, p_d) then ⇨ check user's password
            shingle in the digests
```

```
    return idx + 1  ⇨ return the index for disabling and
coloring keys
        end if
        idx = idx + 1
        end for
    end for
    return −1      ⇨ no reuse detected
end procedure
```

Further, if 'segmentation' preprocessing is set as 'true' then try to segment the password into sub-words and use them for identifying the reuse pattern. For example, the password 'helloalice' could be broken down into ['hello', 'alice'] or ['hell', 'o', 'alice'] or other variants.

The behavioral profiling unit 308 utilizes one or more parameters for modelling one or more behaviors associated with the user. In case of any deviation from the normal behavior which triggers a verification from the customer representative or two factor authentication. The one or more parameters includes but is not limited to (a) mouse click events (e.g., frequency, delay, distance between subsequent clicks, rate of click etc.), and (b) keyboard events (e.g., frequency, delay, distance between subsequent keys, based on keyboard layout, rate of click, applied pressure, device orientation etc.). For example, first dataset includes user behavioral data, i.e., method of interaction with the virtual keyboard which contains information about key (e.g., button in keyboard) presses, time range between key presses, the number of attempt for key presses, corrective actions, and time takes to complete creation, confirmation, and recall. The data to analyze ease with the system, password creation behavior, coping strategy used when the blacklist validation fails, and the effect of the PKBD 200 on the virtual keyboard interaction behavior during recall.

Figure 6A:
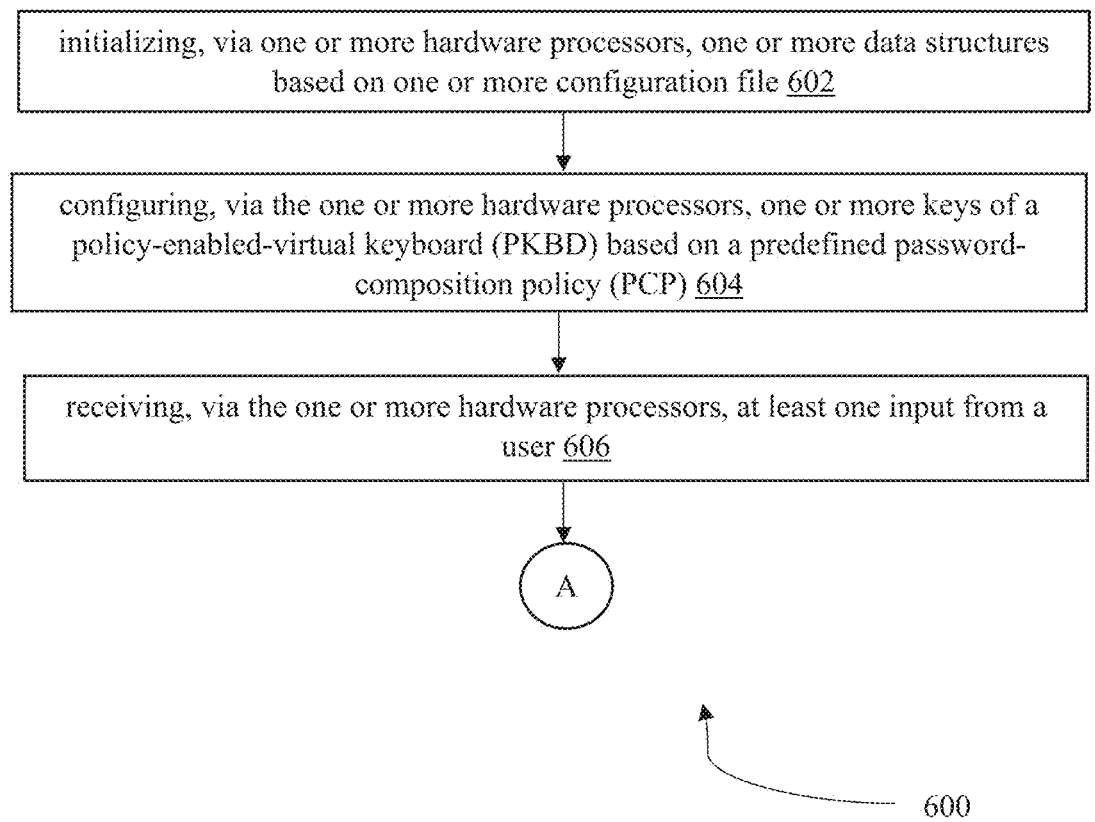
FIGS. 6A, 6B, and 6C are exemplary flow diagrams illustrating a method of creating the compliant password for user by the in-place feedback on the policy-enabled-keyboard (PKBD), according to an embodiment of the present disclosure.
Figure 6B:
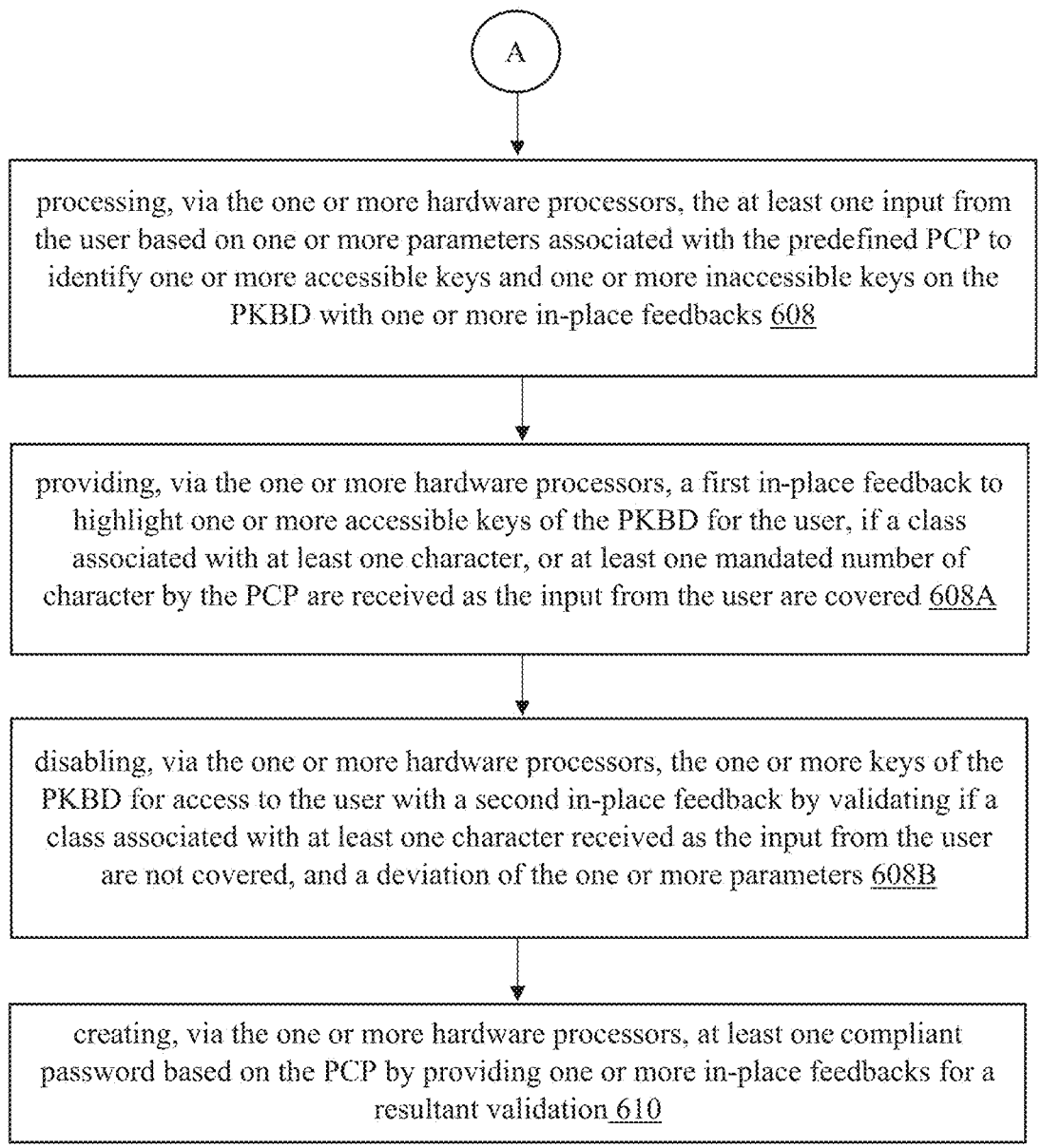
Figure 6C:
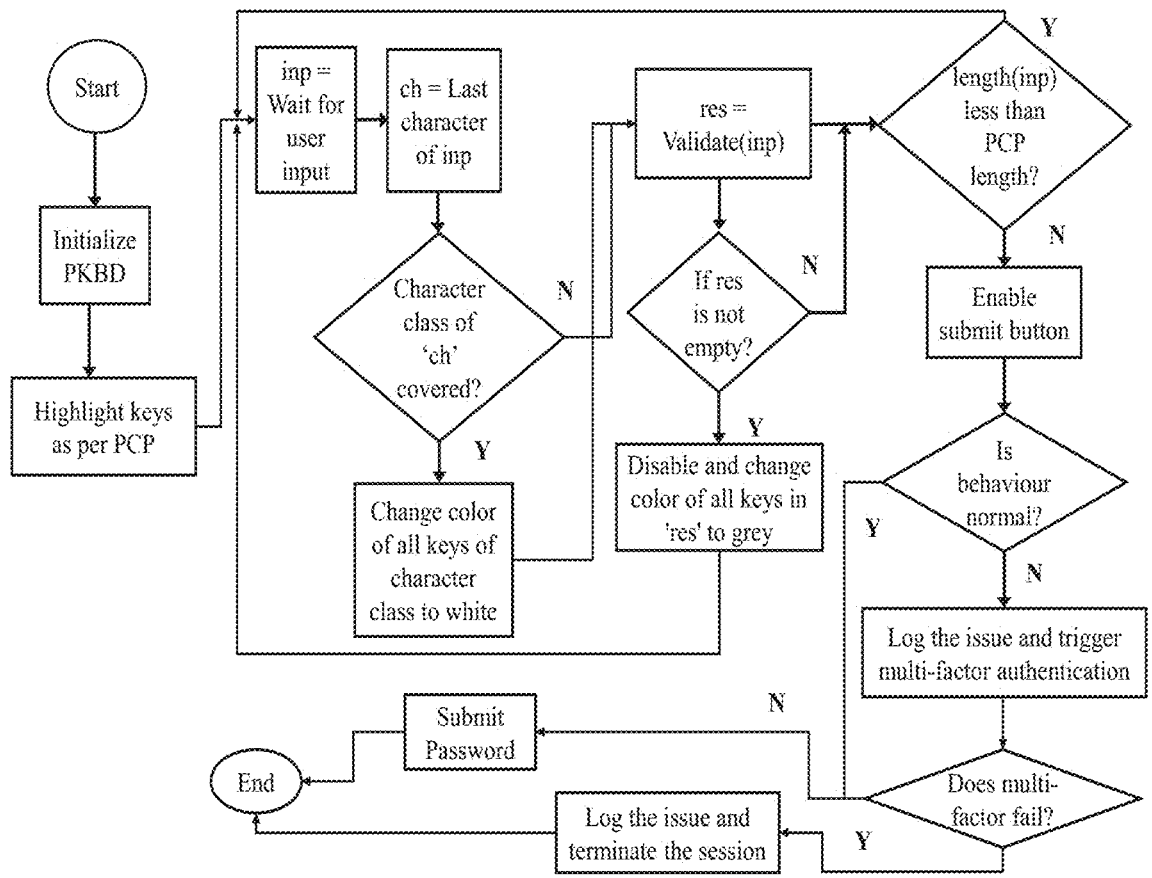

FIG. 6A through FIG. 6C are exemplary flow diagrams illustrating method 600 of creating the compliant password for the user by the in-place feedback on the policy-enabled-keyboard (PKBD) 200, according to an embodiment of the present disclosure. In an embodiment, the system 100 comprises one or more data storage devices or the memory 104 operatively coupled to the one or more hardware processors 102 and is configured to store instructions for execution of steps of the method by the one or more hardware processors 102. The flow diagram depicted is better understood by way of following explanation/description. The steps of the method of the present disclosure will now be explained with reference to the components of the system as depicted in FIGS. 1 and 3.

At step 602, the one or more data structures is initialized based the on one or more configuration file. The one or more data structures correspond to: (a) the password-composition policy structures, (b) the blacklist structure, (c) the cues, (d) the message digest, and (e) the thresholds. At step 604, the one or more keys of the policy-enabled-virtual keyboard (PKBD) 200 is configured based on the password-composition policy (PCP). The password-composition policy structures include (i) the length, (ii) the characters classes, and (iii) the historical reuse requirement. The blacklist structures include (i) the list of dictionaries, (ii) the character threshold, and (iii) the pre-processing, transformations. The cues includes (i) the colors codes, (ii) the audio, and (iii) the haptic. The message digest includes the password, and the pattern digest for the reuse check. The thresholds include threshold for the diversity index, and the suspicious behavior detection. At step 606, the one or more input is received from the user. The one or more input corresponds to one or more keys pressed at the policy-enabled-virtual keyboard (PKBD) 200. At step 608, the one or more input from the user are processed based on one or more parameters associated with password-composition policy to identify one or more accessible keys and one or more inaccessible keys on the policy-enabled-virtual keyboard (PKBD) 200 with the one or more in-place feedbacks. The one or more parameters corresponds to: (a) a deviation from one or more configured password-composition policy, (b) usage of the blacklisted phrases and the keywords, (c) reuse of the personal data, and (d) the behavioural patterns associated with the user. The one or more in-place feedback may correspond to a first in-place feedback, and a second in-place feedback. For example, the one or more in-place feedbacks are: (a) the one or more visual identifiers, (b) the audio feedback, and (c) the haptic cues feedback. The one or more visual identifiers corresponds to one or more color code associated with the one or more keys of the policy-enabled-virtual keyboard (PKBD) 200. The audio feedback corresponds to a notification tone. The haptic cues feedback corresponds to a vibration alert on device of the user. At step 608A, the first in-place feedback is provided to highlight one or more accessible keys of the policy-enabled-virtual keyboard (PKBD) 200 for the user, if class associated with one or more characters, or one or more mandated number of characters by the PCP are received as the input from the user are covered. For example, the one or more mandated number of characters may correspond to one or more lower case characters. At step 608B, the one or more keys of the policy-enabled-virtual keyboard (PKBD) 200 is disabled for access to the user with the second in-place feedback by validating if class associated with at least one character received as the input from the user are not covered, and a deviation of the one or more parameters. At step 610, at least one compliant textual password is created based on the password composition policy by providing one or more in-place feedbacks for a resultant validation. In an embodiment, a finite state machine is maintained to track at least one state of the policy-enabled-virtual keyboard (PKBD) 200 based on the at least one input received from the user. A pre-trained graph neural network (GNN) based model is obtained by the one or more in-place feedbacks to determine one or more behavioural patterns associated with the user. A diversity index is determined to identify number of character classes available in a password dataset from the user based on one or more indices. The diversity index corresponds to statistical representations of password diversity in one or more attributes (e.g., richness, evenness, and dominance). For example, if the behavioural pattern of the user is normal, then the password is submitted, and process is ended. Alternatively, if the behavioural pattern of the user is abnormal, then the issue is logged and triggers multi-factor authentication. If the multi-factor authentication fails, then the issue is logged, and process is terminated.

Figure 7A:
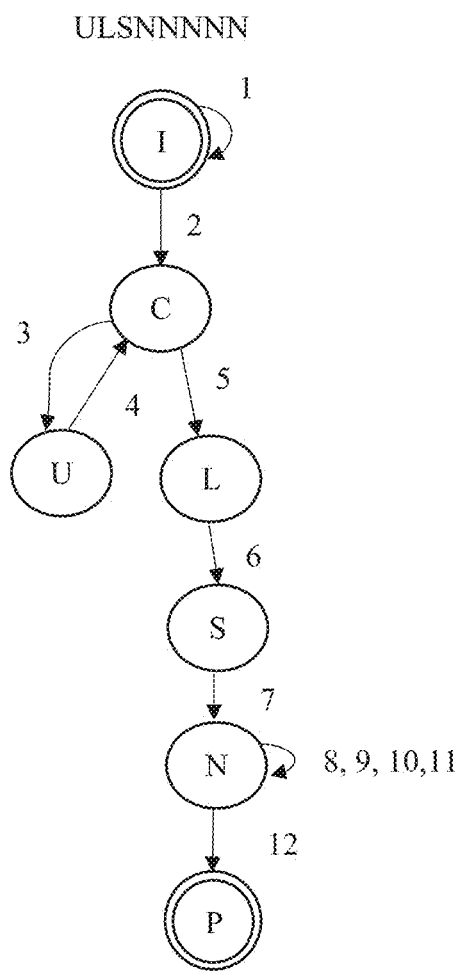
FIGS. 7A, 7B, and 7C are graphical representations illustrating three instances of normal user behavior, according to some embodiments of the present disclosure.
Figure 7B:
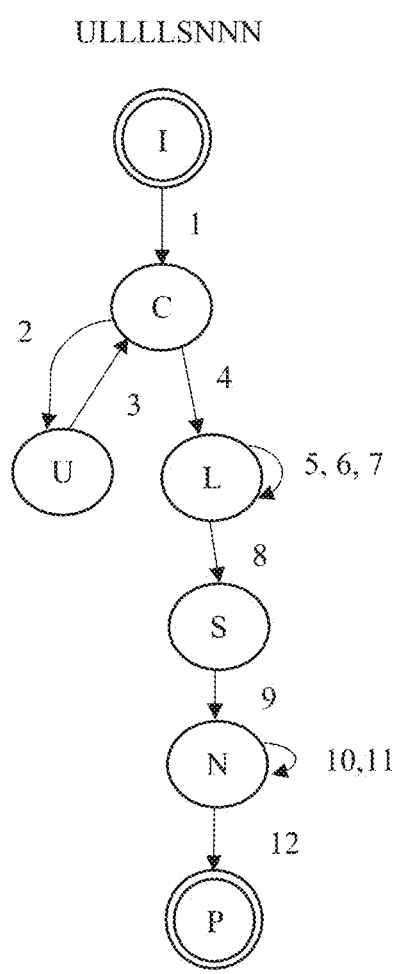
Figure 7C:
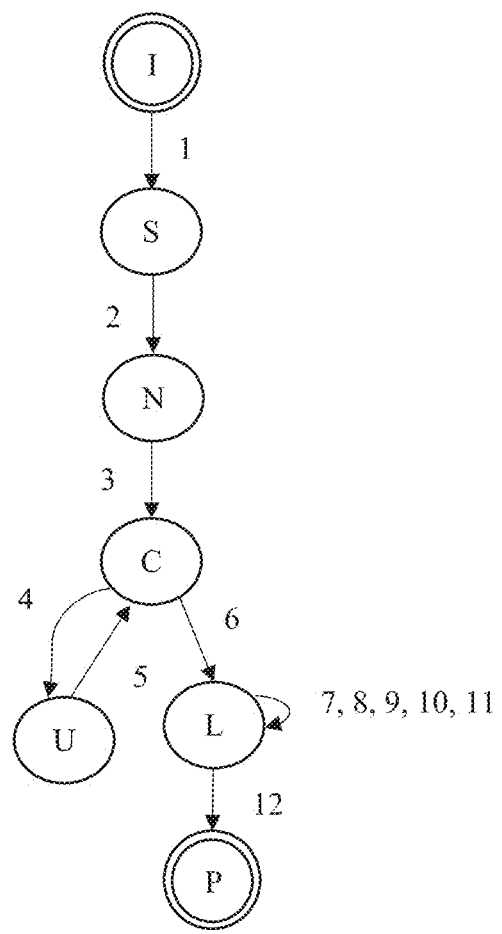

FIGS. 7A through 7C are graphical representations illustrating three instances of a normal user behavior, according to some embodiments of the present disclosure. The user behavior is simple in normal circumstances and follows linear 21 sequence of events (i.e., key presses).

Figure 8A:
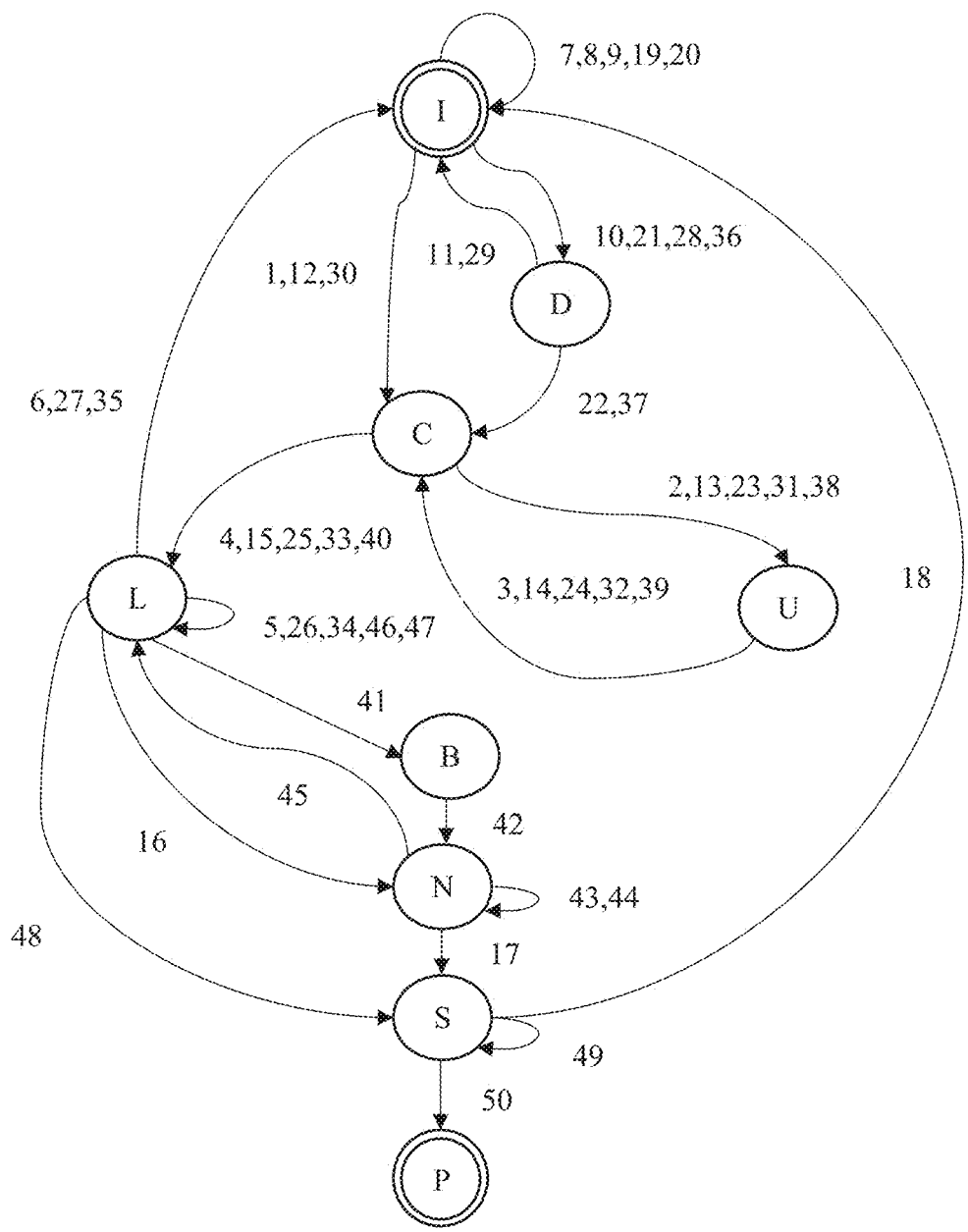
FIGS. 8A, 8B, and 8C are graphical representations illustrating three instances of abnormal user behavior, according to some embodiments of the present disclosure.
Figure 8B:
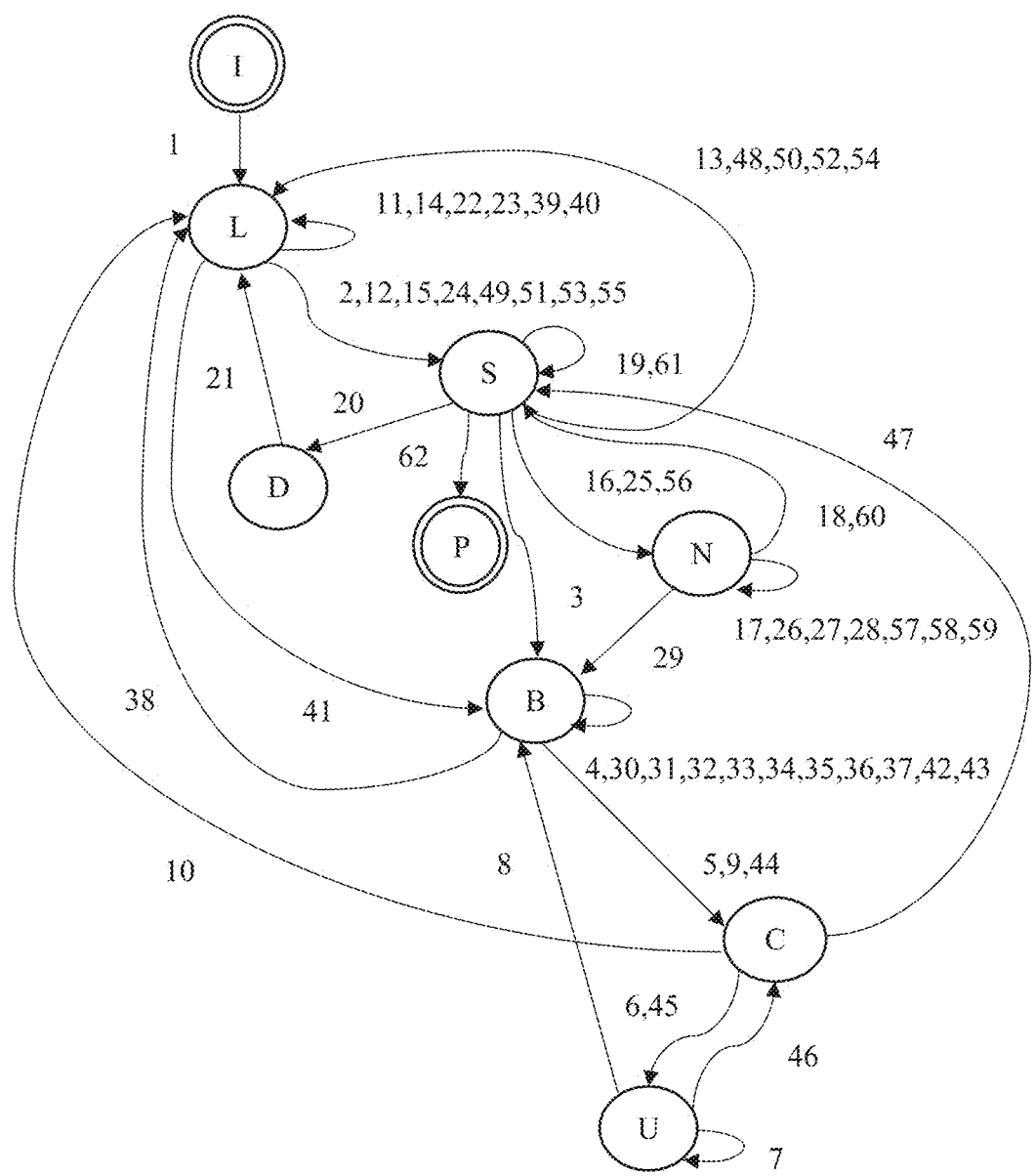
Figure 8C:
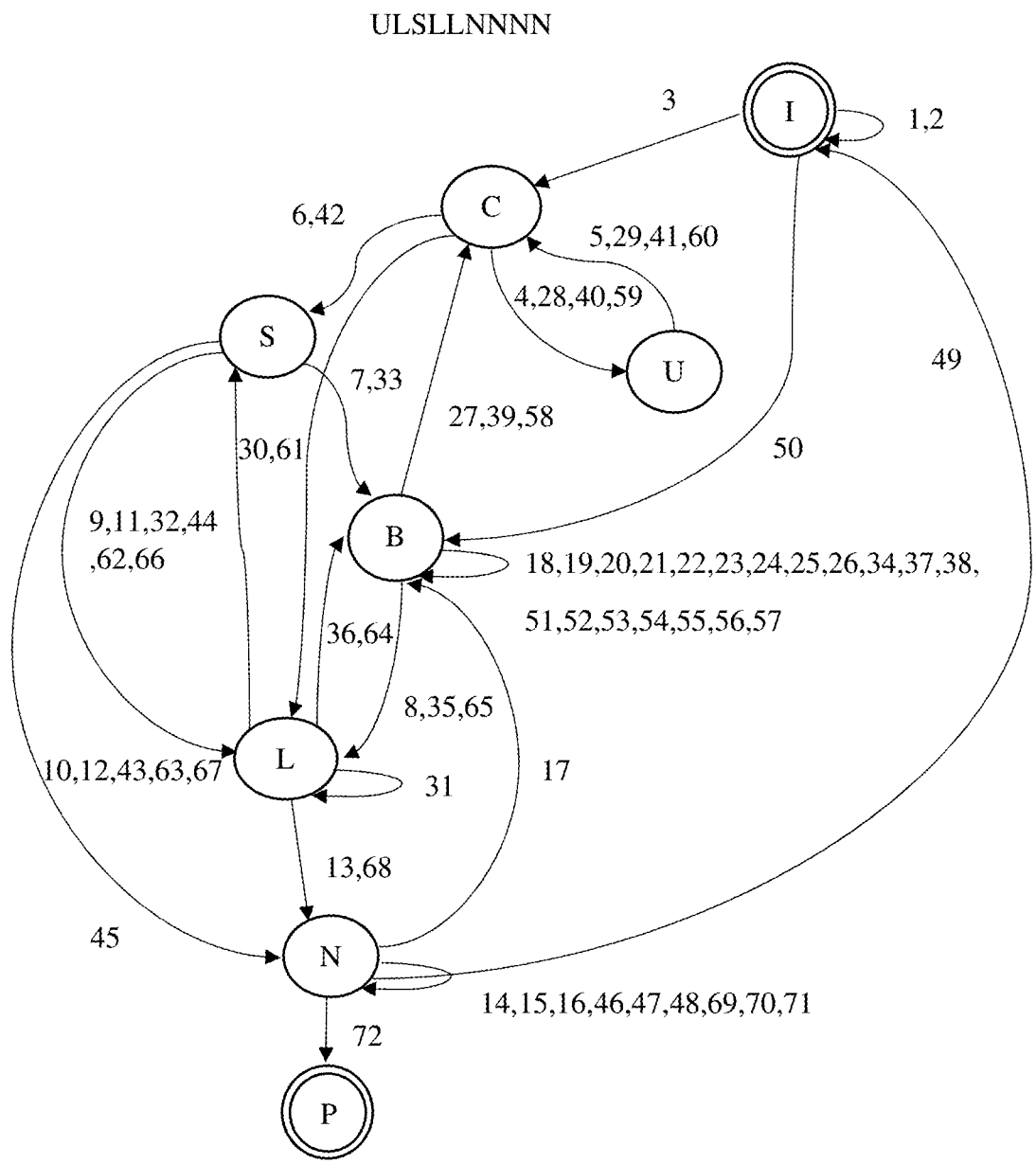

FIGS. 8A through 8C are graphical representations illustrating three instances of an abnormal user behavior, according to some embodiments of the present disclosure. However, in case the user is under stress, or they were new to user interface of the PKBD 200 then the behavior changes significantly. Also, the user takes longer to create passwords, makes mistake, or uses common patterns or simple passwords. The behavioral graphs are considered for training a graph neural network (GNN) which is a class of artificial neural networks for processing data that can be represented as graphs. The graph dataset is manually labelled as 'suspicious' and 'benign' and considered for training a GNN model, which is then used for graph classification task. In an embodiment, a classical graph analysis based sub-module are implemented for detecting any anomaly in the user behavior. The classical analysis considers density and edge methods for determining complexity of the behavior graphs. As is usually compute intensive, The PKBD 200 consider graph analysis for validating high scores received from the GNN classification model. If the graph analysis score more than specified value of 'anomaly' score in the configuration then the keyboard state changes to 'error state'. The security administrators enable two-factor authentication or a direct call to the user for verification in real-time as the user enter the password, to reduce identification time and number of false positives.

The graph structures are efficient and support expressing complex data and events. As mentioned below, table 1 depicts the click events and corresponding short name for graph visualization. In an embodiment, event source InputTextBox, CapsLock and SetPasswordButton may seem redundant, but are useful for assessing cognitive effort required for password creation. For example, in the event sequence ' . . . . LLNLLLBCUSS . . . ', the participant realized that a 'U' is needed in place of fourth 'L' as the issue occurred as the CapsLock ('C') was not pressed. Table 1: Click event source, description, and short name for graph visualization. Except for first and last event, the remaining events are from the virtual keyboard. The first and last events are captured for marking the start and end of the password creation process.

TABLE 1

| Key Event Source | Description | Short Name |
|---|---|---|
| InputTextBox | Click on shows the keyboard | I |
| Uppercase | Uppercase letter | U |
| Lowercase | Lowercase letter | L |
| Numbers | Numeral values | N |
| Symbols | Special characters allowed by PCP | S |
| CapsLock | For capturing transition from U to L, and vice versa | C |
| Backspace | For removing the recent most entered characters | B |
| Clear All | For deleting the entire entered string | D |
| SetPasswordButton | For submitting the password | P |

For example, density-based analysis that is performed in the PKBD 200. For analysis, let G=(V, E) be the directed communication graph of the interaction, where V is set of vertices includes click events, and E is set of edges between them. The complexity of interaction graphs is evaluated on two dimensions: a) number of state transitions, and b) average neighbor degree. The state transition score indicates whether a participant is comfortable with a new interface or not, and identifies unusual usage of corrective keys (e.g., backspace and clear all), which in turn indicates validation errors. Consider, below mentioned are exemplary pseudo codes that shows implementation of state transition score calculation. The average neighbor degree is suggested to be a good measure for analyzing complex graphs. Formally, the average neighborhood degree of a node i is:

$$k_{nn,i} = \frac{1}{|N(i)|} \sum_{j \in N(i)} k_j$$

where, N(i) are the neighbors of node i and $k_j$ is the degree of node j which belongs to N(i).

--- procedure TRANSITIONSCORE (sequence) ⇨ sequence is a list of key press events
  last = '', score = 0, counter = 0
  seq_last_idx = len(seq) − 1
  for token ∈ sequence do
    counter = counter + 1
    if (token == 'InputTextBox') or (token == 'CapsLock') then
      continue
    end if
    if (token == 'SetPasswordButton') and (counter == seq_last_idx) then
      continue
    end if
    if token != last then
      score = score + 1
    end if
  end for
  return score
end procedure

---

The behavioral analysis module is way the behavioral graph is created and analysis for identifying anomalies.

The concept for analyzing diversity in user passwords and in context of passwords, the diversity index is defined as a quantitative measure that reflects how many different character classes there are in a password dataset. The indices are statistical representations of password diversity in different aspects (e.g., richness, evenness, and dominance).

The diversity index may be calculated, for example, Shannon's index (H'), which is weighted geometric mean of the proportional abundances of the classes, and given by, $$H' = \ln\left(\frac{1}{\prod_{i=1}^{R} P_i^{p_i}}\right) \quad (1)$$

where $p_i$ is a proportion of characters belonging to the $i^{th}$ class in the password, and R is a total number of classes in the dataset and also referred as Richness (R).

A second method of calculating the diversity index was provided by Simpson and are calculated as:

$$D = 1 - \left(\frac{\sum n(n-1)}{N(N-1)}\right) \quad (2)$$

where, n is a total number of characters of a particular class, N is the total number of characters of all classes and the value of D ranges between 0 and 1. An index of 1 represents infinite diversity, whereas 0 means no diversity. The key 'diversity' in the configuration acts as a threshold value below which the diversity of the user's password should not fall. For example, should be noted that a high diversity shows more randomness in password, whereas a low value indicates frequent use of certain classes. In the PKBD 200, default value of 'diversity' is set as 0.7 and if the user diversity index falls below this then a warning message is shown. The security administrators consider to promote good password practice.

The embodiments of present disclosure herein addresses unresolved problem of security and concerns related to usability issues arising from complexity or insufficiency of the password composition policies (PCP) for password creation. The embodiments of the present disclosure provide a variant of the virtual keyboard, to create password with the in-place feedback i.e., visual feedback, audio feedback, and haptic feedback for actions from the user. The embodiments of the present disclosure provides a mechanism available in the password creation that inform users about the different character class requirement by providing visual, audio, and haptic cues. The in-place feedback provides an easy to use process for users of all age-groups as they are unable to follow one or more good practices for the password creation or require additional assistance in form of visual, haptic, or auditory feedback. The in-place feedback saves additional time needed during a password validation failure for a round trip to a server. The proposed feedback system helps in creating a memorable and compliant password without the need of the password manager. The in place feedback in which the change in one or more color codes reduces cognitive load on the user as only three colors need to be remembered.

The embodiments of the present disclosure reduces number of attempts needed for creation of a memorable and strong password. Therefore, the user is less prone to develop/adopt a coping strategy to circumvent the authentication system, which is usually common with complex PCP and text-based user-interfaces. There is no need to change end-user behavior post password creation thereby promotes good password hygiene without adding any cognitive load. A natural language processing based model and a heuristic based model are employed for identifying password and sequence reuse which helps in reducing the potential password space for the user for a given PCP, i.e., character classes and length requirement. The password is never stored, and all the processing happens on client side to preserve privacy. The high diversity index for the user password is promoted and maintained for avoiding probabilistic password guessing attacks. Identification of suspicious password creation behavior, e.g., for certain domains such as banking and finance where monetary value is associated with an account. The embedding of the password composition policy in the virtual keyboard (KBD) and providing the in-place feedback to users helps in making the user passwords more diverse and secure against probabilistic guessing attack. For example, graph based techniques are utilized to identify behavioral anomalies that require a security experts' attention and requirement of multi-factor authentication, for example, two factor authentication by sending a onetime password (OTP) on registered phone number. The diversity index provides a good insight on how user password habits could lead to successful probabilistic guessing attacks. The embodiment of the present disclosure provides capability of password search reduction by removing common patterns.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, comprising:
   initializing, via one or more hardware processors, one or more data structures based on one or more configuration file;
   configuring, via the one or more hardware processors, one or more keys of a policy-enabled-virtual keyboard (PKBD) based on a predefined password-composition policy (PCP);
   receiving, via the one or more hardware processors, at least one input from a user, wherein the at least one input corresponds to one or more keys pressed at the PKBD;
   processing, via the one or more hardware processors, the at least one input from the user based on one or more parameters associated with the predefined PCP to identify one or more accessible keys and one or more inaccessible keys on the PKBD with one or more in-place feedbacks, wherein the step of processing comprises:
      (a) providing, via the one or more hardware processors, a first in-place feedback to highlight one or more accessible keys of the PKBD for the user, if a class associated with at least one character, or at least one mandated number of character by the PCP are received as the input from the user are covered, wherein at least one mandated number of character corresponds to at least one lower case character, or
      (b) disabling, via the one or more hardware processors, the one or more keys of the PKBD for access to the user with a second in-place feedback by validating if a class associated with at least one character received as the input from the user are not covered, and a deviation of the one or more parameters; and
   creating, via the one or more hardware processors, at least one compliant password based on the PCP by providing one or more in-place feedbacks for a resultant validation.

2. The processor implemented method of claim 1, wherein one or more data structures correspond to: (a) PCP structures, (b) blacklist structure, (c) cues, (d) message digest, and (e) thresholds, wherein the PCP structures comprises: (i) length, (ii) characters classes, and (iii) historical reuse requirement, wherein the blacklist structure comprises: (i) a list of dictionaries, (ii) a character threshold, and (iii) pre-processing, transformations, wherein the cues comprises: (i) colors codes, (ii) audio, and (iii) haptic, wherein the message digest comprises: password, and pattern digest for reuse check, and wherein thresholds comprises: threshold for a diversity index, and a suspicious behavior detection.

3. The processor implemented method of claim 1, wherein the one or more parameters corresponds to: (a) a deviation from one or more configured PCPs, (b) a usage of blacklisted phrases and keywords, (c) a reuse of personal data, and (d) one or more behavioural patterns associated with the user.

4. The processor implemented method of claim 1, wherein the one or more in-place feedbacks corresponds to (a) one or more visual identifiers, (b) an audio feedback, and (c) a haptic cues feedback, wherein the one or more visual identifiers corresponds to one or more color code associated with the one or more keys of the PKBD, wherein the audio feedback corresponds to a notification tone, and wherein the haptic cues feedback corresponds to a vibration alert on a device of the user.

5. The processor implemented method of claim 1, wherein a finite state machine is maintained to track at least one state of the PKBD based on the at least one input received from the user.

6. The processor implemented method of claim 1, wherein a pre-trained graph neural network (GNN) based model is obtained by the one or more in-place feedbacks to determine one or more behavioural patterns associated with the user.

7. The processor implemented method of claim 1, wherein the diversity index is determined to identify a number of character classes available in a password dataset from the user, and wherein the diversity index corresponds to statistical representations of password diversity in one or more attributes.

8. A system, comprising:
   a memory storing instructions;
   one or more communication interfaces; and
   one or more hardware processors coupled to the memory via the one or more communication interfaces, wherein the one or more hardware processors are configured by the instructions to:
   initialize one or more data structures based on one or more configuration file;
   configure one or more keys of a policy-enabled-virtual keyboard (PKBD) based on a predefined password-composition policy (PCP);
   receive at least one input from a user, wherein the at least one input corresponds to one or more keys pressed at the PKBD;
   process the at least one input from the user based on one or more parameters associated with the predefined PCP to identify one or more accessible keys and one or more inaccessible keys on the PKBD with one or more in-place feedbacks, wherein the step of processing comprises:
      (a) provide a first in-place feedback to highlight one or more accessible keys of the PKBD for the user, if a class associated with at least one character, or at least one mandated number of character by the PCP are received as the input from the user are covered, wherein at least one mandated number of character corresponds to at least one lower case character, or
      (b) disable the one or more keys of the PKBD for access to the user with a second in-place feedback by validating if a class associated with at least one character received as the input from the user are not covered, and a deviation of the one or more parameters; and
   create at least one compliant password based on the PCP by providing one or more in-place feedbacks for a resultant validation.

9. The system of claim 8, wherein one or more data structures correspond to: (a) PCP structures, (b) blacklist structure, (c) cues, (d) message digest, and (e) thresholds, wherein the PCP structures comprises: (i) length, (ii) characters classes, and (iii) historical reuse requirement, wherein the blacklist structure comprises: (i) a list of dictionaries, (ii) a character threshold, and (iii) pre-processing, transformations, wherein the cues comprises: (i) colors codes, (ii)

audio, and (iii) haptic, wherein the message digest comprises: password, and pattern digest for reuse check, and wherein thresholds comprises: threshold for a diversity index, and a suspicious behavior detection.

10. The system of claim 8, wherein the one or more parameters corresponds to: (a) a deviation from one or more configured PCPs, (b) a usage of blacklisted phrases and keywords, (c) a reuse of personal data, and (d) one or more behavioural patterns associated with the user.

11. The system of claim 8, wherein the one or more in-place feedbacks corresponds to (a) one or more visual identifiers, (b) an audio feedback, and (c) a haptic cues feedback, wherein the one or more visual identifiers corresponds to one or more color code associated with the one or more keys of the PKBD, wherein the audio feedback corresponds to a notification tone, and wherein the haptic cues feedback corresponds to a vibration alert on a device of the user.

12. The system of claim 8, wherein a finite state machine is maintained to track at least one state of the PKBD based on the at least one input received from the user.

13. The system of claim 8, wherein a pre-trained graph neural network (GNN) based model is obtained by the one or more in-place feedbacks to determine one or more behavioural patterns associated with the user.

14. The system of claim 8, wherein the diversity index is determined to identify a number of character classes available in a password dataset from the user, and wherein the diversity index corresponds to statistical representations of password diversity in one or more attributes.

15. One or more non-transitory machine readable information storage mediums comprising one or more instructions which when executed by one or more hardware processors cause:
   initializing, one or more data structures based on one or more configuration file;
   configuring, one or more keys of a policy-enabled-virtual keyboard (PKBD) based on a predefined password-composition policy (PCP);
   receiving, at least one input from a user, wherein the at least one input corresponds to one or more keys pressed at the PKBD;
   processing, the at least one input from the user based on one or more parameters associated with the predefined PCP to identify one or more accessible keys and one or more inaccessible keys on the PKBD with one or more in-place feedbacks, wherein the step of processing comprises:
   (a) providing, a first in-place feedback to highlight one or more accessible keys of the PKBD for the user, if a class associated with at least one character, or at least one mandated number of character by the PCP are received as the input from the user are covered, wherein at least one mandated number of character corresponds to at least one lower case character, or (b) disabling, the one or more keys of the PKBD for access to the user with a second in-place feedback by validating if a class associated with at least one character received as the input from the user are not covered, and a deviation of the one or more parameters; and
   creating, at least one compliant password based on the PCP by providing one or more in-place feedbacks for a resultant validation.

16. The one or more non-transitory machine-readable information storage mediums of claim 15, wherein one or more data structures correspond to: (a) PCP structures, (b) blacklist structure, (c) cues, (d) message digest, and (e) thresholds, wherein the PCP structures comprises: (i) length, (ii) characters classes, and (iii) historical reuse requirement, wherein the blacklist structure comprises: (i) a list of dictionaries, (ii) a character threshold, and (iii) pre-processing, transformations, wherein the cues comprises: (i) colors codes, (ii) audio, and (iii) haptic, wherein the message digest comprises: password, and pattern digest for reuse check, and wherein thresholds comprises: threshold for a diversity index, and a suspicious behavior detection.

17. The one or more non-transitory machine-readable information storage mediums of claim 15, wherein the one or more parameters corresponds to: (a) a deviation from one or more configured PCPs, (b) a usage of blacklisted phrases and keywords, (c) a reuse of personal data, and (d) one or more behavioural patterns associated with the user.

18. The one or more non-transitory machine-readable information storage mediums of claim 15, wherein the one or more in-place feedbacks corresponds to (a) one or more visual identifiers, (b) an audio feedback, and (c) a haptic cues feedback, wherein the one or more visual identifiers corresponds to one or more color code associated with the one or more keys of the PKBD, wherein the audio feedback corresponds to a notification tone, and wherein the haptic cues feedback corresponds to a vibration alert on a device of the user, and wherein a pre-trained graph neural network (GNN) based model is obtained by the one or more in-place feedbacks to determine one or more behavioural patterns associated with the user.

19. The one or more non-transitory machine-readable information storage mediums of claim 15, wherein a finite state machine is maintained to track at least one state of the PKBD based on the at least one input received from the user.

20. The one or more non-transitory machine-readable information storage mediums of claim 15, wherein the diversity index is determined to identify a number of character classes available in a password dataset from the user, and wherein the diversity index corresponds to statistical representations of password diversity in one or more attributes.

* * * * *